(No Model.) 2 Sheets—Sheet 1.

C. W. STICKNEY.
PROCESS OF AND APPARATUS FOR ROASTING ORES.

No. 512,235. Patented Jan. 2, 1894.

Witnesses
J. Halpenny
A. H. Korfer

Inventor:
C. Wade Stickney (No Model.) 2 Sheets—Sheet 2.
C. W. STICKNEY.
PROCESS OF AND APPARATUS FOR ROASTING ORES.
No. 512,235. Patented Jan. 2, 1894.
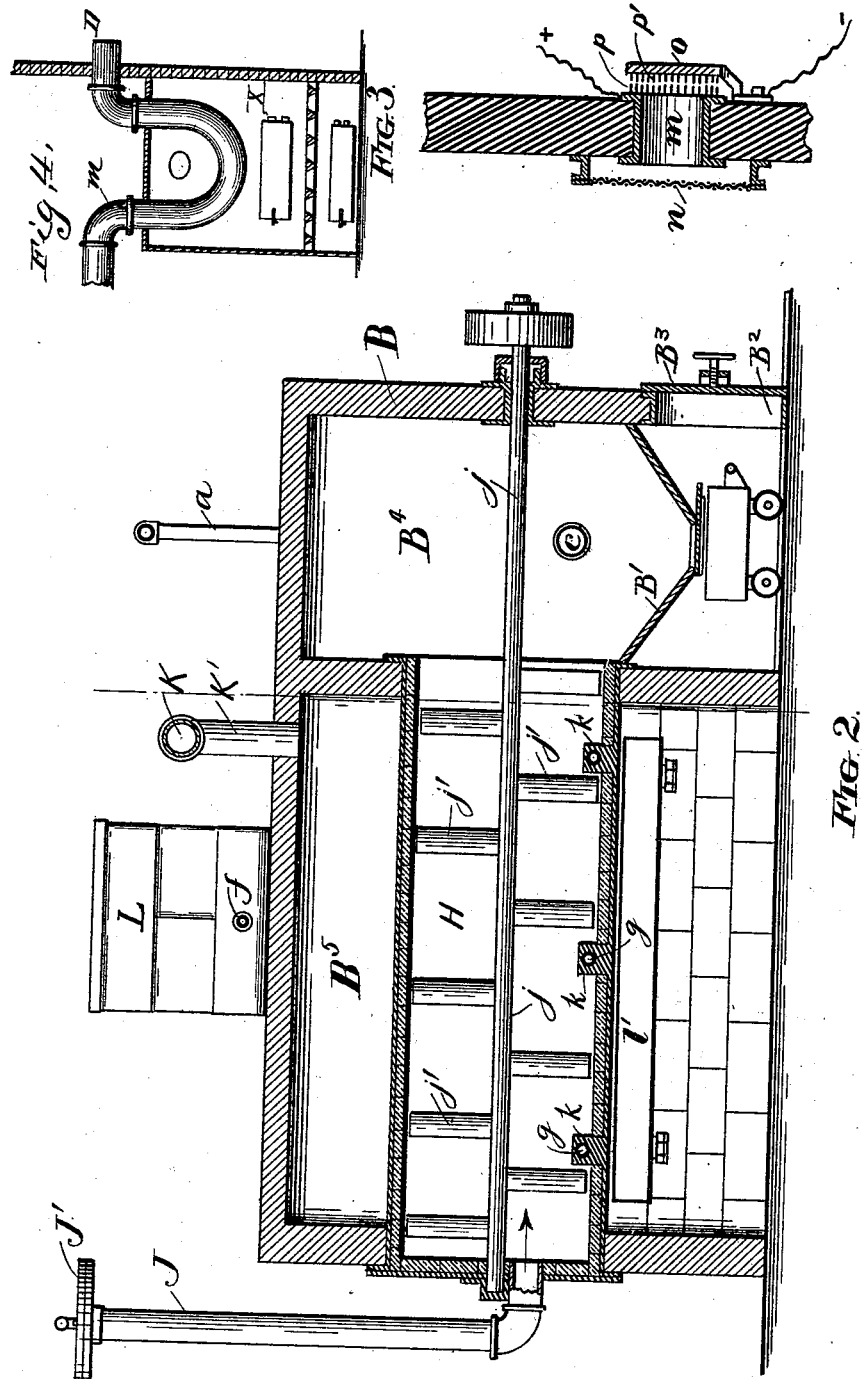
Witnesses:
J. Halpenny
W. H. Coper.
Inventor:
C. Wade Stickney.

UNITED STATES PATENT OFFICE.

CHARLES WADE STICKNEY, OF KETCHUM, IDAHO.

PROCESS OF AND APPARATUS FOR ROASTING ORES.

SPECIFICATION forming part of Letters Patent No. 512,235, dated January 2, 1894.

Application filed March 7, 1893. Serial No. 464,982. (No model.)

*To all whom it may concern:*

Be it known that I, CHARLES WADE STICKNEY, a citizen of the United States, residing at Ketchum, Idaho, have invented a certain new and Improved Process of and Apparatus for Roasting Ores, of which the following is a specification.

My invention is a process of roasting sulphur bearing ores in such a way as to deposit the sulphur in solid form instead of allowing it to pass off in a gaseous form, as is usual, and the necessary apparatus for carrying on the process.

The process is a modification of my Patent No. 475,824 and also of a subsequent patent allowed January 31, 1893, No. 493,193. It consists of roasting the ore by steam, raised to a red heat, cooling the resulting sulphureted hydrogen and other gases and passing them into another chamber where they are mingled with a current of air from a pressure blower, raising the temperature of the mixture by electrical sparks or by direct heat on its passage to another chamber and finally spraying the gases with a solution of sulphates in another chamber.

Figure 1 is a side sectional view of the furnace and its attached apparatus for depositing and collecting the sulphur. Fig. 2, is a front sectional view of the roasting furnace. Fig. 3, is an enlarged view of the electrical combining apparatus, shown in Fig. 1. Fig. 4, is a sectional view of another form of combining apparatus.

Fig. 1 shows the furnace A, consisting of firebox A' and a chamber above it, in which the steam generator, G, is placed; B is the ore roasting chamber, showing the ore roasting cylinder H lined with firebrick inside; $B^4$ and $B^5$ are the two compartments of chamber B. C shows the dust and cooling chamber, having the cold water coil, $d$; C' shows the mixing chamber with gas pipe, $b$, and air inlet pipe $a$; D shows the combining chamber and $m$, $o$, $p$, $p'$, show the electrical apparatus for combining the gases with safety gauze $n$; E shows the spraying chamber, having above it the spraying tank M and below it the catch basin N; F shows the stack; L shows the solution tank; I shows the air blower.

Fig. 2. shows a sectional view of the roasting chamber on the line 2, 2 of Fig. 1 turned ninety degrees to the right, showing cylinder H and power shaft $j$, which is provided with stirrers $j'$; $g$ shows the tuyeres and J shows the feeding apparatus.

Fig. 3, is an enlarged view of the combining apparatus.

Fig. 4 shows a sectional view of the combining apparatus where external heat is used as the means to effect the combination of the gases, showing the passage way $m$ elongated and passing through a heat generating apparatus, viz. the furnace X, and on into the combining chamber D.

Figure 1:
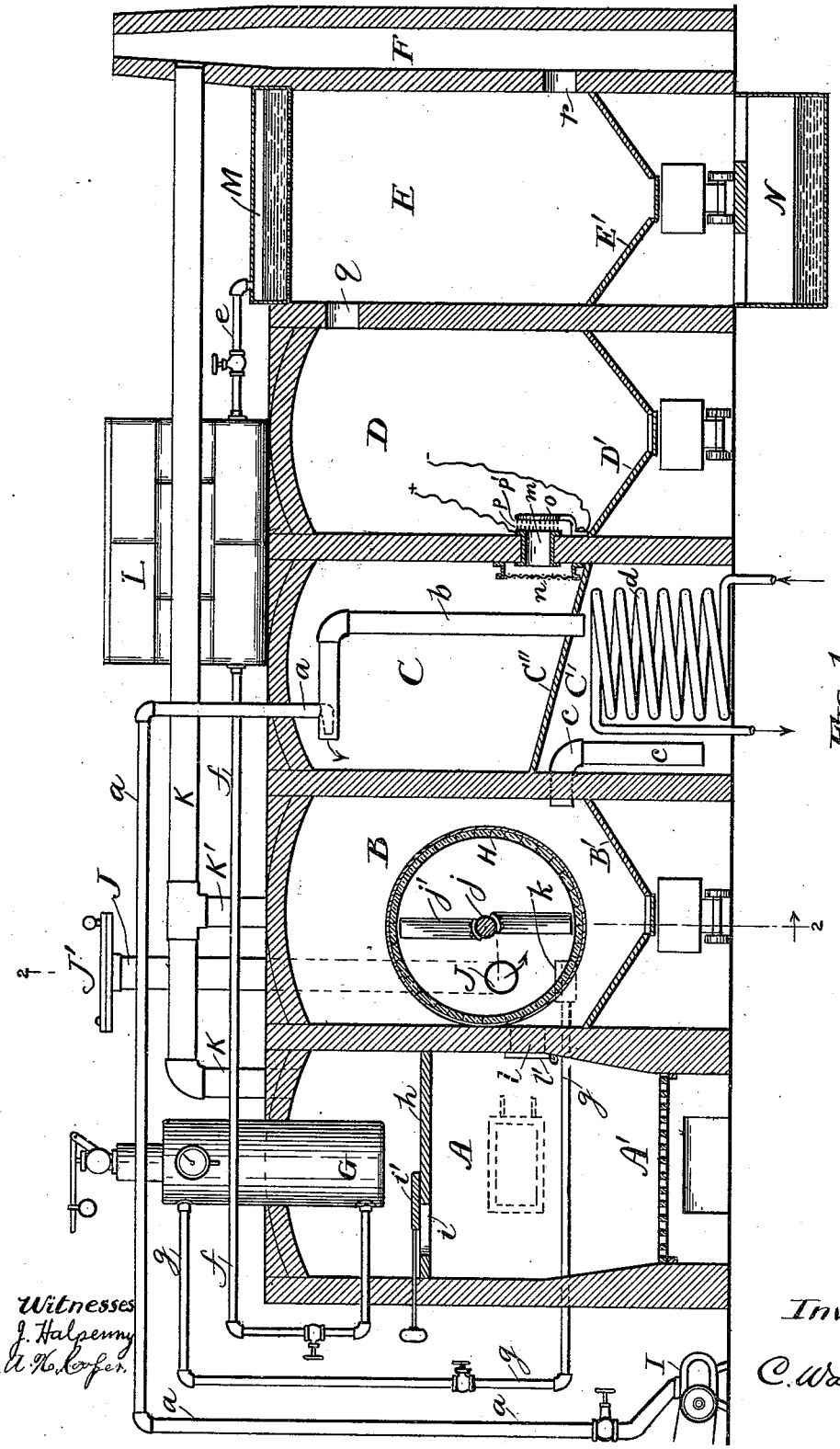

The construction of the apparatus is as follows:—A is made similar to the ordinary brick work beneath a boiler, but a diaphragm, $h$, is placed above the firebox, provided with an opening $i$ and a damper $i'$ to control the amount of heat admitted to the boiler G. Through the side of the firebox, there is an opening $l$, provided with a damper $l'$, which opening communicates with $B^5$ the left hand chamber of B, but not with the right, $B^4$ as shown in Fig. 2. The furnace A is provided with smoke flue K which leads into the stack F. A steam pipe, $g$, leads from the boiler's upper part down through the firebox A' and into the tuyeres $k$. In Fig. 2 three of such pipes and tuyeres are shown, communicating with the interior of cylinder, H. From the bottom of the boiler, G, a blowoff pipe, $f$, communicates with solution tank L. The roasting chamber B is formed of two compartments, $B^4$, $B^5$, having no communication with each other. The damper $l'$, admits heat from the furnace to the chamber $B^5$ and the smoke passes out through K'. (See Fig. 2.) Steam pipe $g$ Fig. 2, passing into tuyere $k$ admits steam to the interior of the roasting cylinder from which the gases pass into chamber $B^4$ and thence out through the pipe $c$. There is a standpipe J, Fig. 2 closed at the top by a heavy iron plate and flange J' and having its lower end passing into the roasting cylinder H, which forms the means for feeding the cracked ore into the roasting cylinder. Longitudinally through the cylinder passes a power shaft $j$, having attached to it pieces of metal, $j'$, whose faces are inclined at an angle of forty-five degrees from the direction of motion of the shaft, $j$, and looking toward the chamber $B^4$, the purpose of which is to constantly stir the ore and work it toward the chamber B⁴. The latter is provided with a sloping false bottom B', having a central aperture, which delivers the roasted ore into a car placed beneath. The chamber B⁴, has a close fitting door B³ closing the doorway B² and secured in any suitable way.

A pipe c communicates from the chamber B⁴ into C' Fig. 1, and in this chamber a coil of metallic pipe, d, is placed, communicating interiorly with some outside source of cold water supply. From the chamber C' a passage or pipe, b, communicates with chamber C and in this passage, near its opening into C, a pipe is let, bringing air from a pressure blower I. A passage way, m, is made from mixing chamber C' to combining chamber D. In the chamber C in front of the passage m, a metallic gauze or perforated sheet, n, is placed, allowing no gases to pass from one chamber to the other except they pass through this gauze. The purpose of n, is to prevent the heat generated in D from passing into the chamber C and exploding the mixture of gases on the principle of the Davy safety lamp. Two or more gauzes may be used in the same way for greater safety. At the opening of the passage m into combining chamber D, is placed a great number of small needles projecting from the orifice of the passage at the edges, shown at p, Figs. 1 and 3, which are electrically connected with one wire from a source of electricity. Opposite these needles and separated from them by a very small interval, other needles p' are set upon a metallic frame or disk, o, and electrically connected with the opposite electrical pole. The chamber D is provided with a false bottom D' sloping toward the center and having a small aperture in it closed and opened by any convenient device. A passage, q, connects chamber D with spraying chamber E, above which is placed a tank M, having a perforated bottom, by which a shower of water is produced throughout the chamber, which tank M is connected with solution tank L by means of a pipe and cock, e. Chamber E is provided with a false bottom E' similar to that described for chamber D and also with a shallow catch basin N which communicates with a large shallow basin outside the chamber, by which means the strength of the solution is increased by evaporation. Chamber E has a passage r communicating with the stack, F.

The boiler G and connecting pipes f and g are made of copper, and where the pipe or pipes g pass through the firebox A' they are made of cast copper and very heavy and this construction is also that of the tuyeres k. The lower joint of the feed pipe J, the power shaft j and the stirrers j' are also made of copper and the power shaft is hollow and connected with a water supply pipe for the purpose of keeping it and the connected stirrers at a temperature not above boiling point. The boiler is fed with weak solution from basin N, and has a blow off pipe f, near its bottom leading into solution tank L, by which means the solution, concentrated by evaporation is frequently blown off into tank L. The boiler may be lined with sheet lead, the better to resist the action of the sulphates.

The process is as follows:—The firebox A' being red hot and also the pipes g and a pressure of two or three pounds per square inch got up in the boiler which is filled with a solution of sulphate of iron or alumina or any mixed sulphates which may be cheaply had and the ore cylinder H being filled to about one-third of its height with ore and the mouth of the ore supply pipe J being closed down the cock is turned, admitting steam through the pipes g. The steam, by passing through the firebox, is emitted through the tuyeres, k, red hot, and passes up through the ore. The ore is kept moving and slowly working toward the chamber B⁴. The steam decomposes, producing oxides of the metals, sulphreted hydrogen, and other gases, which find their outlet through c into the cooling chamber C which is kept at a lower temperature by the coil d. This chamber is much larger in proportion than shown in the drawings, the coil being placed in the upper part. In this chamber, the gases drop the flue dust. They then pass on through b, and mingling with the air blast from pipe a they diffuse in mixing chamber C'. They then pass out through the gauze end and through the passage m, and between the points p, p' between which electric sparks are constantly flying. Only sufficient air is admitted through the air pipe, a, to satisfy the hydrogen in the gases and a large part of the sulphur falls in the solid form in the chamber D. At the same time, some sulphur is oxidized forming sulphurous acid gas and some sulphureted hydrogen escapes oxidation. These gases pass on through the passage q and are sprayed with the solution from the tanks L, M, and, as stated before, in the patents referred to above, the two gases unite in the presence of the solution forming water and solid sulphur. The waste gases then pass on up the stack, practically free from sulphur. The cooling chamber C is also a dust chamber and is used to cause the gases to drop the metallic dust. Otherwise this dust would be mixed with the sulphur, to the detriment of both.

The agitation of the ore may be continuous or intermittent. I prefer the latter as it permits the stirrers to be out of the hot ore most of the time, thus decreasing the wear. Any other method of agitating the ore may be used without substantially altering the process.

Instead of the electrical apparatus, m, o, p, p', the passage m may be lengthened and heated to redness by external heat. Instead of the blower being placed where it is and forcing the air in, a cupola fan-blower may be used on the stack, creating a suction current through the several chambers.

The test for the admission of the proper quantity of air through the pipe a, necessary to effect the oxidation of the hydrogen and the non-oxidation of the sulphur is in the smell of the gases going up the stack. A preponderance of sulphureted hydrogen calls for more air, or, if the smell of sulphurous acid gas is present, less air is admitted.

The process is substantially complete when the gases arrive in chamber D, but the spraying in chamber E is an improvement resulting in a further yield of sulphur and removal of more of the noxious quality of the gases passing up the stack.

I do not confine myself to the particular form of heating the passage m, illustrated in Fig. 4. It may be heated by gas jets or by material kept in an incandescent state by an electric current, situated either within or on the outside of the passage m, or by any other convenient means.

Having described my invention, I claim—

1. The process of roasting ores and depositing the sulphur in a solid form by bringing steam in contact with the ore at a red or higher heat, agitating the ore, reducing the temperature of the gases, mixing them with a quantity of air sufficient for the oxidation of the hydrogen, but insufficient for the oxidation of the sulphur, and combining the oxygen of the air with the hydrogen of the gases by subjecting the mixture to the action of electrical discharges, substantially as described.

2. The process of roasting ores and depositing the sulphur in a solid form by bringing steam in contact with the ore at a red or higher heat, agitating the ore, reducing the temperature of the gases, mixing them with a quantity of air sufficient for the oxidation of the hydrogen, but insufficient for the oxidation of the sulphur and combining the oxygen of the air with the hydrogen of the gases by bringing the mixture to a red heat, substantially as described.

3. The process of roasting ores and depositing the sulphur in a solid form by bringing steam in contact with the ore at a red or higher heat, agitating the ore, reducing the emperature of the gases, mixing them with a quantity of air sufficient for the oxidation of the hydrogen, but insufficient for the oxidation of the sulphur, combining the oxygen of the air with the hydrogen of the gases and spraying the residual gases with a sulphate solution substantially as described.

4. In an apparatus for roasting ore and depositing the sulphur in a solid form at one operation the following elements in combination, substantially as described. A steam generator, and steam pipes connecting it with an ore receptacle, means for agitating the ore while roasting, a dust and cooling chamber, a mixing chamber for mingling air with the gases from the roasting ore, means for raising the temperature of the mixture, and a sulphur collecting chamber.

5. In an apparatus for roasting ore and depositing the sulphur in a solid form at one operation, the following elements in combination substantially as described; a steam generator, and steam pipes connecting it with an ore receptacle, means for agitating the ore while roasting, a dust and cooling chamber, a chamber for mingling air with the gases from the roasting ore, means for raising the temperature of the mixture, a sulphur collecting-chamber and a chamber for spraying the residual gases.

6. In an apparatus for roasting ore and depositing the sulphur in a solid form at one operation, the following elements in combination substantially as described; a steam generator, and steam pipes connecting it with an ore receptacle, and terminating in tuyeres leading into said receptacle, a furnace for keeping the steam and ore at a red heat, means for agitating the roasting ore, a dust chamber provided with means for reducing the temperature of the gases, a mixing chamber and air blower with suitable connecting pipes, means for heating the mixture of air and gases to an incandescent temperature, and a sulphur collecting chamber.

CHARLES WADE STICKNEY.

Witnesses:
G. I. STICKNEY,
E. HEGSTROM.